United States Patent Office.

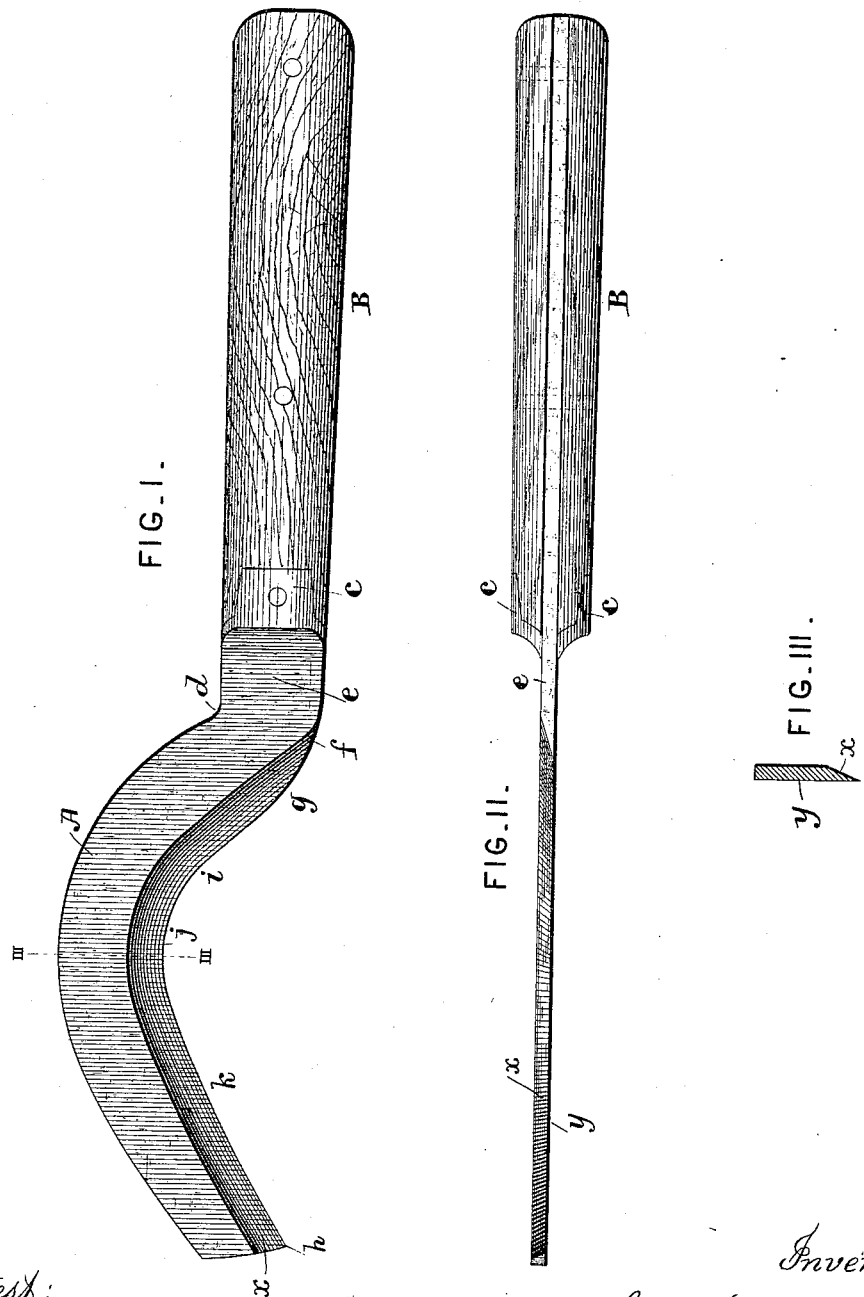

JAMES F. VANDYKE AND JOHN P. BARNS, OF ANDERSON, INDIANA.

PRUNING-KNIFE.

SPECIFICATION forming part of Letters Patent No. 336,270, dated February 16, 1886.

Application filed August 1, 1885. Serial No. 173,263. (No model.)

*To all whom it may concern:*

Be it known that we, J. F. VANDYKE and JOHN P. BARNS, both of Anderson, in the county of Madison and State of Indiana, have invented certain new and useful Improvements in Pruning and Dowel-Pin Knives; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Our invention relates to the special character of the cutting-edge and to the contour or shape of such edge, the objects being to make the implement more efficient in action, and to render it easier to cut rapidly and completely.

In the drawings, Figure I is a face or plan view, Fig. II a front or edge view, and Fig. III a cross-section through the cutter or blade, of a pruning-knife embodying our invention.

A is the blade, firmly attached to a handle, B, the shank of the blade preferably extending through the handle and riveted thereto. We prefer also to strengthen the connection by side pieces, $c\ c$, which embrace the upper end of the handle. The shank of the blade projects a short distance beyond the handle and in line with it before the cutting-edge commences, and at this point $d$ it takes a direction backward, so as to make about an angle of one hundred and twenty degrees, or thereabout, with this projecting portion $e$, the line of the portion $f$ of the cutting-edge making about the same angle with the front edge of the shank, but being rounded off, as shown at $g$. The cutting-edge, from its commencement at $g$ to its end at $h$, is formed by making a bevel on one side only of the blade, the opposite side of the blade remaining as a plane, so that the cutting-edge throughout is constituted by the meeting-line of this plane and bevel, as is clearly shown in Fig. II, in which $x$ indicates the bevel and $y$ the plane or non-beveled side of the blade. From $f$ to $i$ the edge of the blade has a slight inward curvature, which gradually increases into one of much shorter radius, as seen at $j$, and thence the edge continues in a line curved slightly inward from a straight line to the end $h$ of the blade, as shown at $k$, the general direction from $j$ to $h$ being about thirty degrees (more or less) to the left of a line extending lengthwise through the center of the handle. There is no hooked terminus at the end of the blade.

In operation the rounded part $g$ of the cutting-edge commences without abruptness the incision in the branch, twig, plant, stalk, dowel, or other growth or article to be cut. The drawing movement of the blade toward the operator brings the concave part from $f$ to $i$ of the cutter more deeply into the body of the wood, taking in a little more of its circumference. The further pull of the knife brings the more abruptly-curved part $j$ into action, and which likewise, besides cutting still deeper, takes in a new and larger part of the circumference of the wood; and the further action of the cutter (if the twig or branch, by reason of its size, be not already completely severed) brings into action the long but gently curved part from $j$ to $h$, to finish the cut. It will readily be seen that the backward bend of the blade from its shank $e$ permits the whole blade, and especially the part from $j$ to $h$, to have a traversing and riding or saw-like cut on the wood throughout its whole length, which it could not have if the cutting-edge from $j$ to $h$ had a position approaching a line at right angles with the handle, because then the pull of the cutter would be such as to cut but little, if any, as it would greatly preclude the traverse of the edge across the wood, and such a difficulty would be much enhanced if the blade terminated in a sort of hook. With the form shown in the drawings, the cutter readily frees itself from the article being cut; but the bevel edge of this cutter has great advantages. A double bevel acts like a wedge to tighten the blade in the wood, especially in green, sappy, growing plants. The plano-bevel blade above described, however, tends to press the part of the wood being severed and unsupported directly by the trunk or body of the plant away from the supported and more resisting part, so that the binding action is materially lessened, for it will be observed that in the cutter shown, which is made for a right-handed man, the plane or level side of the blade will face the trunk or body of the tree or plant, while the beveled side will be off or away from it. The action is therefore, in this respect, similar to some extent to that of a mortising-chisel in deflecting the cut part away from the main body of the material.

This knife we find to be very efficient and valuable for cutting dowel-pins—as, for instance, in making barrel-heads the parts of which are doweled together. The dowels having been driven into the holes bored for them in one of the edges of the heading, their ends need to be sharpened in order to be placed in the adjacent edge.

It is found by practice that a workman can clip five hundred of these pins in the same time that he could sharpen only about one hundred with the instruments usually employed. After clipping the dowel-pin with the plane edge, then by simply placing the knife with its beveled edge next the pin we clip or trim off the feather edge of the prior cut.

We claim—

1. A pruning-knife having a blade turning backward from the handle and then curving and turning away nearly in a straight line in the reverse direction, and formed at its edge by means of a bevel on one side only of the blade, as shown and described.

2. The described pruning-knife as made with its cutting-edge formed by a plane, $y$, and single bevel $x$, and the contour of such edge being shaped as described, with the portions $g\,f\,i\,j\,k\,h$, and the blade being applied to its handle in substantially the position and relation as set forth.

JAMES F. VANDYKE.
JOHN P. BARNS.

Witnesses:
WM. EHMEN,
W. K. BAILEY,
FRED BELL.